United States Patent
Des Aulniers (10) Patent No.: US 7,517,459 B2
(45) Date of Patent: Apr. 14, 2009

(54) VESSEL WITH OXYGENATION SYSTEM AND DECONTAMINATION METHOD

(75) Inventor: Jacques Des Aulniers, Fort Lauderdale, FL (US)

(73) Assignee: USA Pelican Inc., Miami, FL (US)

( * ) Notice: Subject to any disclaimer, the term of this patent is extended or adjusted under 35 U.S.C. 154(b) by 113 days.

(21) Appl. No.: 10/930,688

(22) Filed: Aug. 31, 2004

(65) Prior Publication Data

US 2006/0011555 A1    Jan. 19, 2006

Related U.S. Application Data

(60) Provisional application No. 60/588,198, filed on Jul. 15, 2004.

(51) Int. Cl.
*C02F 1/78*    (2006.01)
(52) U.S. Cl. .................... 210/747; 210/759; 210/760
(58) Field of Classification Search .............. 210/747, 210/758, 760, 764, 759
See application file for complete search history.

(56) References Cited

U.S. PATENT DOCUMENTS 3,755,142 A    8/1973    Whipple, Jr. ................ 210/63
4,008,156 A    2/1977    Chastan-Bagnis ........... 210/242
4,921,605 A    5/1990    Chastan-Bagnis et al. ... 210/115

FOREIGN PATENT DOCUMENTS

| EP | 366010 | 5/1990 |
| JP | 05245485 | 9/1993 |
| JP | 405245485 A | 9/1993 |
| JP | 09118291 A * | 5/1997 |

OTHER PUBLICATIONS

1999 P.E.R.M. Pelican Inc. brochure.

* cited by examiner

*Primary Examiner*—Matthew O Savage
(74) *Attorney, Agent, or Firm*—Robert C Kain, Jr.

(57) ABSTRACT

The waterborne vessel, in one embodiment, utilizes an underwater tunnel through which passes flowing water, an ozone gas generator, an ozone plus hydroxyl radical gas generator and a source of atmospheric oxygen. A manifold mixer mixes pressurized water independently with the ozone, the ozone plus hydroxyl radical gas and the atmospheric oxygen to produce corresponding oxygenated water mixtures. Each of these oxygenated water mixtures are fed via a conduit system into the confined flow of water passing through the tunnel. A diversion channel with reverse flow channel permits super saturation of diverted flow from the primary underwater tunnel channel to provide super saturated oxygenated water with ozone plus hydroxyl radical gases and atmospheric oxygen water mixtures. A decontamination method is also provided.

9 Claims, 9 Drawing Sheets

VESSEL WITH OXYGENATION SYSTEM AND DECONTAMINATION METHOD

This is a regular patent application based upon and claiming priority of provisional patent application 60/588,198 filed Jul. 15, 2004.

The present invention relates to a waterborne vessel with an oxygenation system which decontaminates surrounding water and a method therefor.

BACKGROUND OF THE INVENTION

Ozone ($O_3$) is one of the strongest oxidizing agents that is readily available. It is known to eliminate organic waste, reduce odor and reduce total organic carbon in water. Ozone is created in a number of different ways, including ultraviolet (UV) light, and corona discharge of electrical current through a stream of air or other gazes oxygen stream, among others. Ozone is formed when energy is applied to oxygen gas ($O_2$). The bonds that hold oxygen together are broken and three oxygen molecules are combined to form two ozone molecules. The ozone breaks down fairly quickly and as it does so it reverts back to pure oxygen, that is, an $O_2$ molecule. The bonds that hold the oxygen atoms together are very weak which is why ozone acts as a strong oxidant. In addition, it is known that hydroxyl radicals OH also act as a purification gas. Hydroxyl radicals are formed when ozone, ultraviolet radiation and moisture are combined. Hydroxyl radicals are more powerful oxidants than ozone. Both ozone and hydroxyl radical gas break down over a short period of time (about 8-15 minutes) into oxygen. Hydroxyl radical gas is a condition in the fluid or gaseous mixture.

Some bodies of water have become saturated with high levels of natural or man made materials which have a high biological oxygen demand and which in turn have created an eutrophic or anaerobic environment. It would be beneficial to clean these waters utilizing the various types of ozone and hydroxyl radical gases.

OBJECTS OF THE INVENTION

It is an object of the present invention to provide a waterborne vessel with an oxygenation system and a method to decontaminate surrounding water.

It is a further object of the present invention to provide an oxygenation system on a waterborne vessel and a method of decontamination wherein ozone and/or hydroxyl radical gas is injected, mixed and super saturated with a flow of water through the waterborne vessel.

It is an additional object of the present invention to provide a super saturization channel which significantly increases the amount of time the ozone and/or hydroxyl radical gas mixes in a certain flow volume of water thereby oxygenating the water and decontaminating that defined volume of flowing water prior to further mixing with other water subject to additional oxygenation in the waterborne vessel.

It is an additional object of the present invention to provide a mixing manifold to mix the ozone independent with respect to the hydroxyl radical gas and independent with respect to atmospheric oxygen and wherein the resulting oxygenated water mixtures are independently fed into a confined water bound space in the waterborne vessel to oxygenate a volume of water flowing through that confined space.

SUMMARY OF THE INVENTION

The waterborne vessel, in one embodiment, utilizes an underwater tunnel through which passes flowing water, an ozone gas generator, an ozone plus hydroxyl radical gas generator and a source of atmospheric oxygen. A manifold mixer mixes pressurized water independently with the ozone, the ozone plus hydroxyl radical gas and the atmospheric oxygen to produce corresponding oxygenated water mixtures. Each of these oxygenated water mixtures are fed via a conduit system into the confined flow of water passing through the tunnel. A diversion channel with reverse flow channel permits super saturation of diverted flow from the primary underwater tunnel channel to provide super saturated oxygenated water with ozone plus hydroxyl radical gases and atmospheric oxygen water mixtures. A decontamination method is also provided.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a waterborne vessel with an oxygenation system and a method to decontaminate water surround the vessel.

Figure 1:
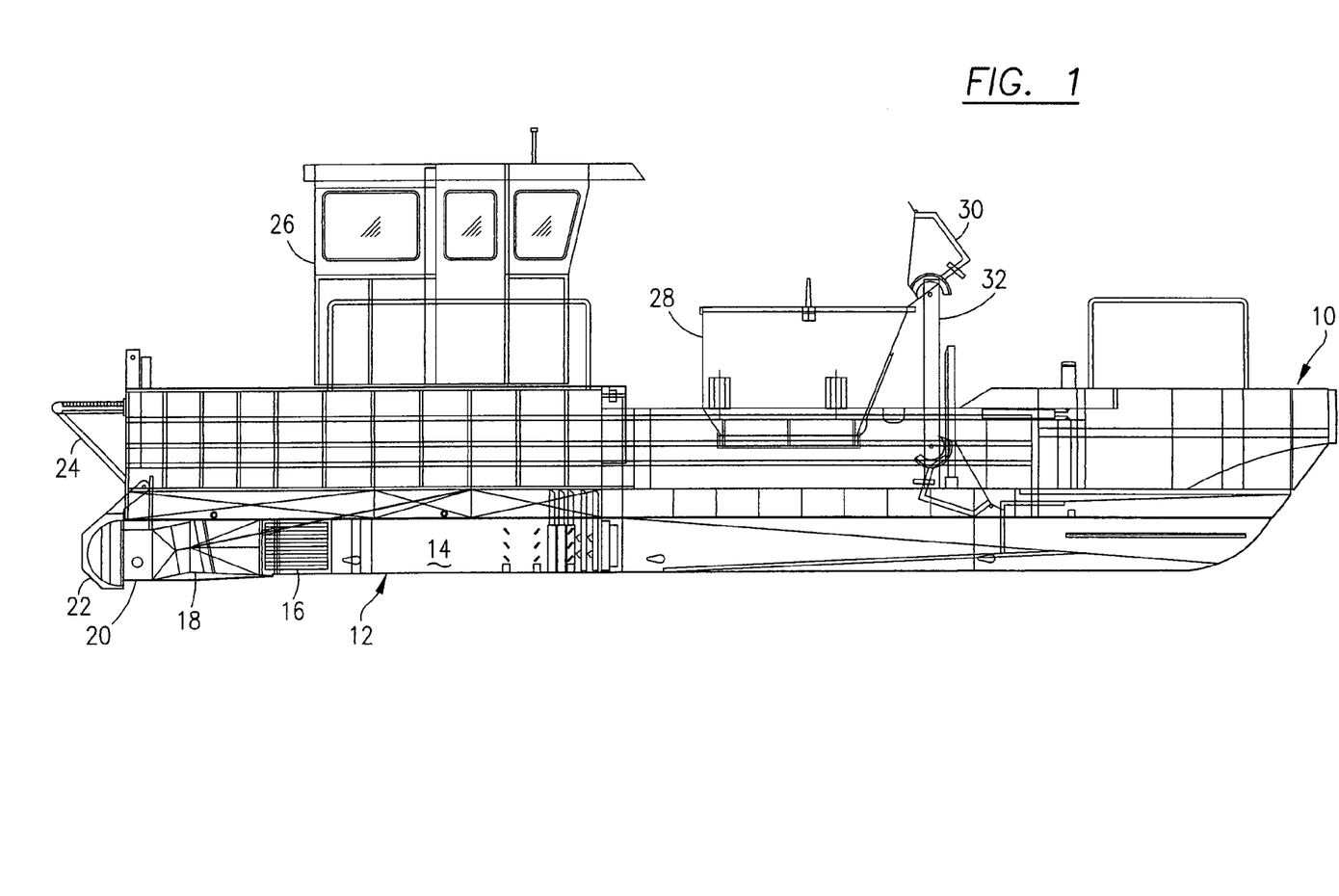
FIG. 1 diagrammatically illustrates a side elevational view of the waterborne vessel with an oxygenation system of the present invention.

FIG. 1 diagrammatically illustrates waterborne vessel 10 having an oxygenation system 12 disposed in an underwater tunnel 14 beneath the waterline of vessel 10. In general, water flow is established through tunnel 14 based upon the opened/closed position of gills 16 and the operation of the propeller at propeller region 18. Tunnel 14 is sometimes called a decontamination tunnel. The tunnel may be a chamber which holds the water to be decontaminated a certain period of time such that the gasses interact with the water to oxidize the critical compounds in the water. Water flow through tunnel 14 is oxygenated and cleaned. Rudder 20 controls the direction of vessel 10 and deflector blade or vane 22 controls the direction of the output flow of oxygenated water either directly astern of the vessel or directly downwards into lower depths of the body of water as generally shown in FIG. 9. The flow path varies from full astern to full down. Lifting mechanism 24 operates to lift deflector blade 22 from the lowered position shown in FIG. 1 to a raised position shown in FIG. 8A. Blade 22 can be placed in various down draft positions to alter the ejected flow of the oxygenated, partially treated water from the body of water surrounding vessel 10.

The crew may occupy cabin 26. A trash canister 28 receives trash from trash bucket 30. Trash bucket 30 is raised and lowered along vertical guide 32. Similar numerals designate similar items throughout the drawings.

Figure 2:
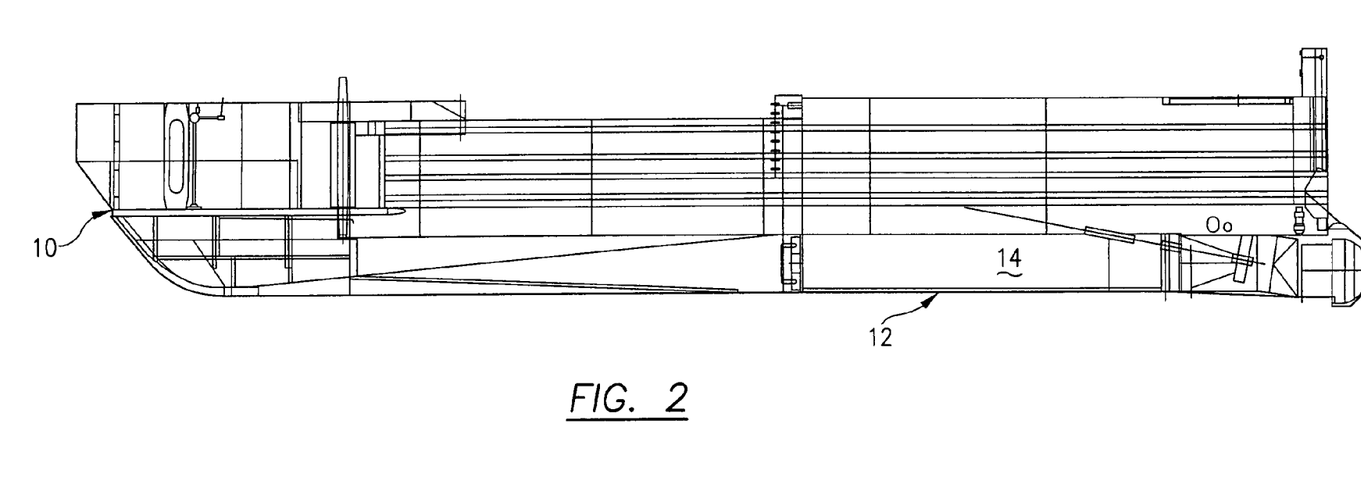
FIG. 2 diagrammatically illustrates a side elevational view of the hull portion with the oxygenation system.

FIG. 2 diagrammatically shows a side elevational view of vessel 10 without the trash bucket and without cabin 26. It should be noted that the waterborne vessel need not include trash container 28 and trash gathering bucket 30. The vessel includes oxygenation system 12 which oxygenates a flow of water through underwater tunnel 14.

Figure 3:
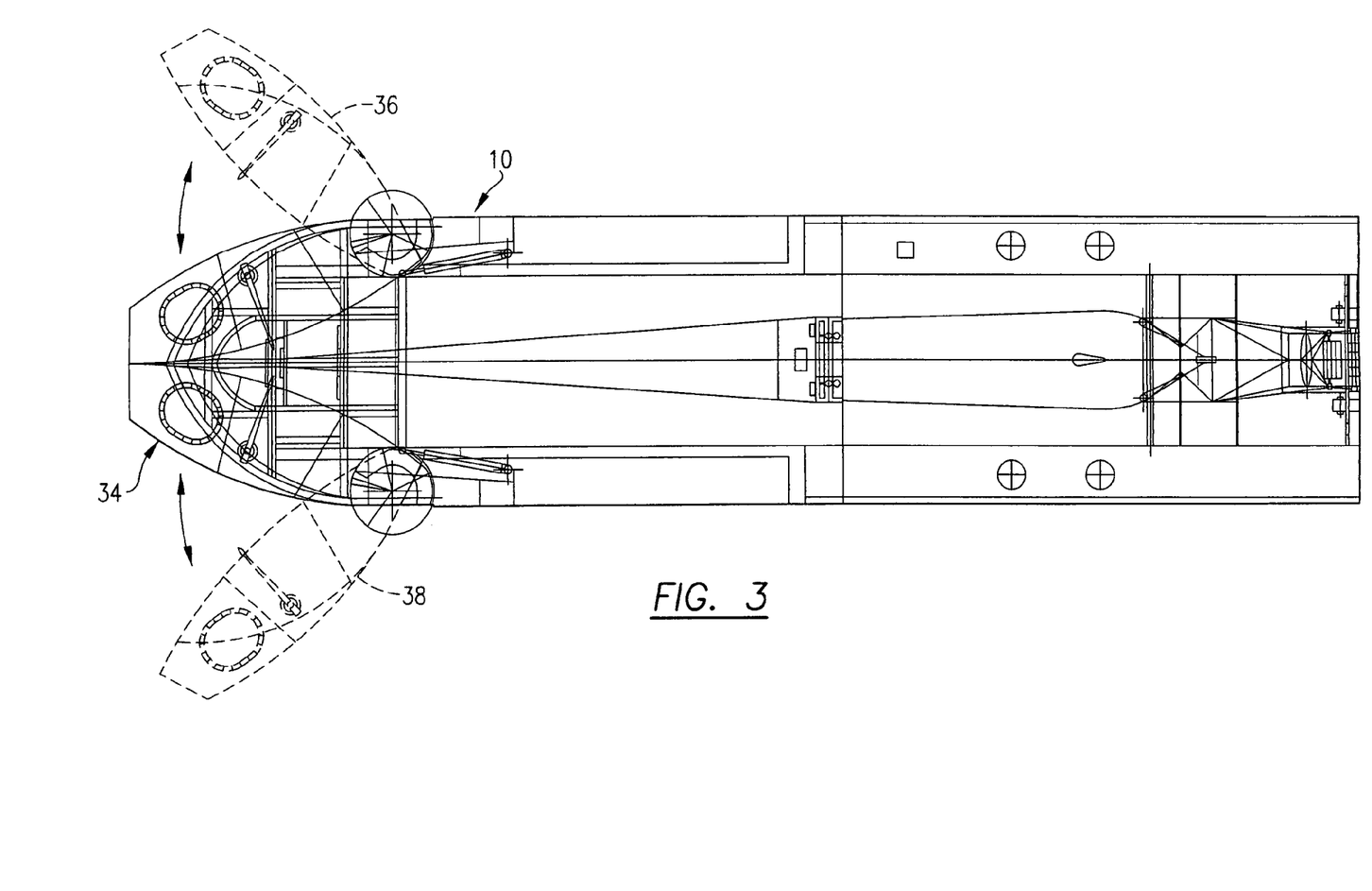
FIG. 3 diagrammatically illustrates a top schematic view of the waterborne vessel.

FIG. 3 diagrammatically illustrates a top schematic view of vessel 10. Bow 34 has laterally extending bow wings 36, 38 that permit a flow of water into an upper deck region. Trash bucket 30 is lowered into this flow of water on the upper deck to capture floating debris and trash from the water being cleaned by the vessel 10. The trash bucket 30 (FIG. 1) is then raised and the contents of bucket 30 is poured over into trash container 28. The extended position of bow wings 36, 38 is shown in dashed lines.

Figures 4A, 4B, 4C:
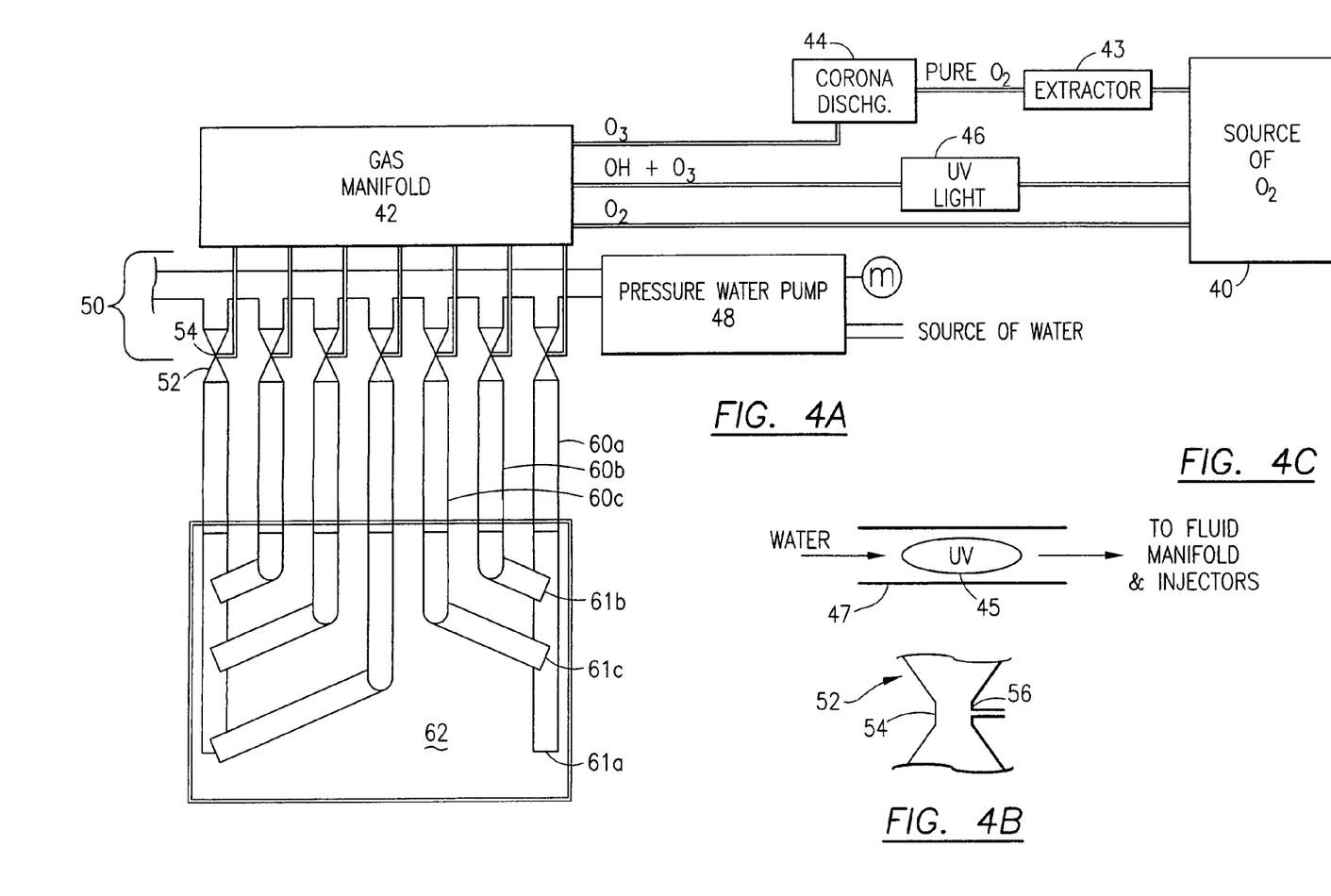
FIG. 4A diagrammatically illustrates one system to create the ozone and hydroxyl radical gases and one system to mix the gases with water in accordance with the principles of the present invention.
FIG. 4B diagrammatically illustrates the venturi port enabling the mixing of the ozone plus pressurized water, ozone plus hydroxyl radical gas plus pressurized water, and atmospheric oxygen and pressurized water.
FIG. 4C diagrammatically illustrates a system which creates oxygenated water which oxygenated water carrying ozone can be injected into the decontamination tunnel shown in FIG. 1.

FIG. 4A shows one embodiment of the oxygenation system. A source of oxygen 40, commonly atmospheric oxygen gas, is supplied to a gas manifold 42. In addition, oxygen gas (atmospheric oxygen gas) is supplied to extractor 43 (manufactured by Pacific Ozone) which creates pure oxygen and the pure oxygen is fed to a corona discharge ozone generator 44. The corona discharge ozone generator 44 generates pure ozone gas which gas is applied to gas manifold 42. Ozone plus hydroxyl radical gases are created by a generator 46 which includes a UV light device that generates both ozone and hydroxyl radical gases. Oxygen and some gaseous water (such as present in atmospheric oxygen) is fed into generator 46 to create the ozone plus hydroxyl radical gases. The ozone plus hydroxyl radical gases are applied to gas manifold 42. Atmospheric oxygen from source 40 is also applied to gas manifold 42. Although source oxygen 40 could be bottled oxygen and not atmospheric oxygen (thereby eliminating extractor 43), the utilization of bottled oxygen increases the cost of operation of oxygenation system 12. Also, the gas fed to generator 46 must contain some water to create the hydroxyl radical gas. A pressure water pump 48 is driven by a motor M and is supplied with a source of water. Pressurized water is supplied to water/gas manifold 50. Water/gas manifold 50 independently mixes ozone and pressurized water as compared with ozone plus hydroxyl radical gas plus pressurized water as compared with atmospheric oxygen plus pressurized water. In the preferred embodiment, water is fed through a decreasing cross-sectional tube section 52 which increases the velocity of the water as it passes through narrow construction 54. A venturi valve (shown in FIG. 4B) draws either ozone or ozone plus hydroxyl radical gas or atmospheric oxygen into the restricted flow zone 54. The resulting water-gas mixtures constitute first, second and third oxygenated water mixtures. The venturi valve pulls the gases from the generators and the source without requiring pressurization of the gas.

FIG. 4B shows a venturi valve 56 which draws the selected gas into the pressurized flow of water passing through narrow restriction 54.

FIG. 4C shows that oxygenated water carrying ozone can be generated using a UV ozone generator 45. Water is supplied to conduit 47, the water passes around the UV ozone generator and oxygenated water is created. This oxygenated water is ultimately fed into the decontamination tunnel which is decribed more fully in connection with the manifold system 50 in FIG. 4A.

In FIG. 4A, different conduits, such as conduits 60A, 60B and 60C, for example, carry ozone mixed with pressurized water (a first oxygenated water mixture) and ozone plus hydroxyl radical gas and pressurized water (a second oxygenated water mixture) and atmospheric oxygen gas plus pressurized water (a third oxygenated water mixture), respectively which mixtures flow through conduits 60A, 60B and 60C into the injector site in the decontamination tunnel. The output of these conduits, that is conduit output ports 61A, 61B and 61C, are separately disposed both vertically and laterally apart in an array at intake 62 of tunnel 14 (see FIG. 1). Although three oxygenated water mixtures are utilized herein, singular gas injection ports may be used.

Figure 12:
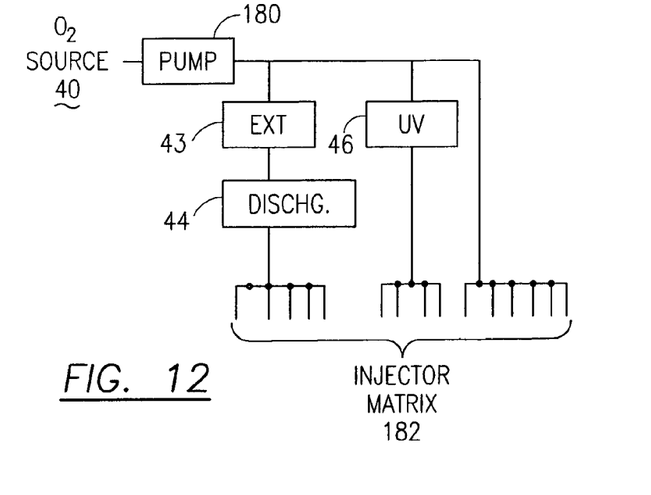
FIG. 12 diagrammatically illustrates a pressurized gas system used to generate ozone, ozone plus hydroxyl radical and pressurized oxygen wherein these gasses are injected into the decontamination tunnel of the vessel.

FIG. 12 shows atmospheric oxygen gas from source 40 which is first pressurized by pump 180 and then fed to extractor 43 to produce pure oxygen, and ozone plus hydroxyl radical gas UV generator 46 and is fed to conduits carrying just the pressurized oxygen to injector matrix 182. The pure oxygen form extractor 43 is fed to an ozone gas generator 44 with a corona discharge. These three pressurized gases (pure ozone, ozone plus hydroxyl radical gas and atmospheric oxygen) is fed into a manifold shown as five (5) injector ports for the pure ozone, four (4) injector ports for the ozone plus hydroxyl radical gas and six (6) ports for the pressurized atmospheric oxygen gas. This injector matrix can be spread out vertically and laterally over the intake of the decontamination tunnel as shown in connection with FIGS. 4A and 5.

Figure 5:
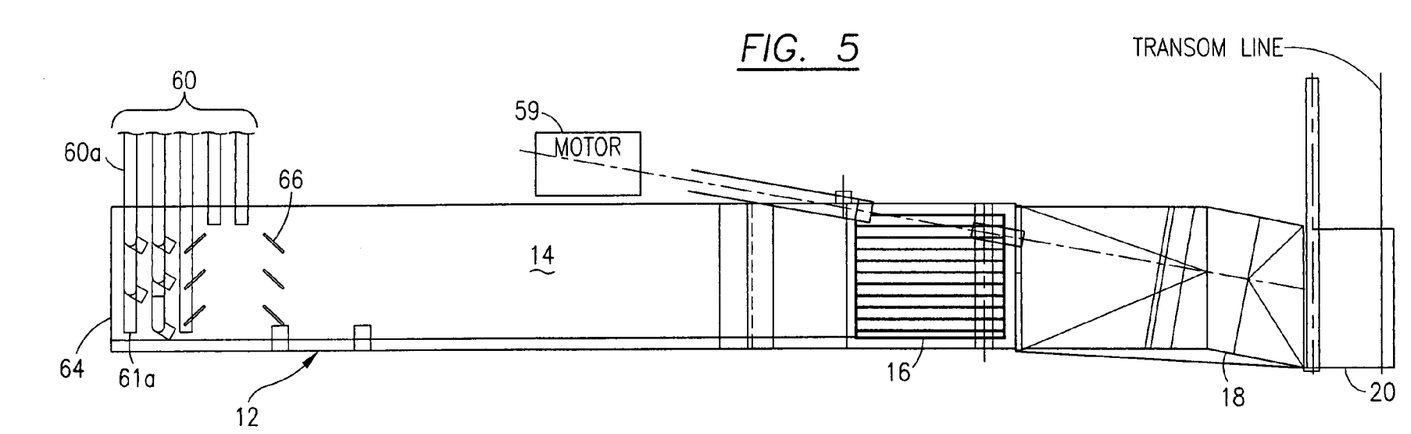
FIG. 5 diagrammatically illustrates a side view of the tunnel through the waterborne vessel.

FIG. 5 diagrammatically illustrates a side elevational schematic view of oxygenation system 12 and, more particularly, tunnel 14 of the waterborne vessel. A motor 59 drives a propeller in propeller region 18. In a preferred embodiment, when gills 16 are open (see FIG. 6), propeller in region 18 creates a flow of water through tunnel 14 of oxygenation system 12. A plurality of conduits 60 each independently carry either an oxygenated water mixture with ozone or an oxygenated water mixture with ozone plus hydroxy radical gases or an oxygenated water mixture with atmospheric oxygen. These conduits are vertically and laterally disposed with outputs in an array at the intake 64 of the tunnel 14. A plurality of baffles, one of which is baffle 66, is disposed downstream of the conduit output ports, one of which is output port 61A of conduit 60A. Tunnel 14 may have a larger number of baffles 66 than illustrated herein. The baffles create turbulence which slows water flow through the tunnel and increases the cleansing of the water in the tunnel with the injected oxygenated mixtures due to additional time in the tunnel and turbulent flow.

Figure 6:
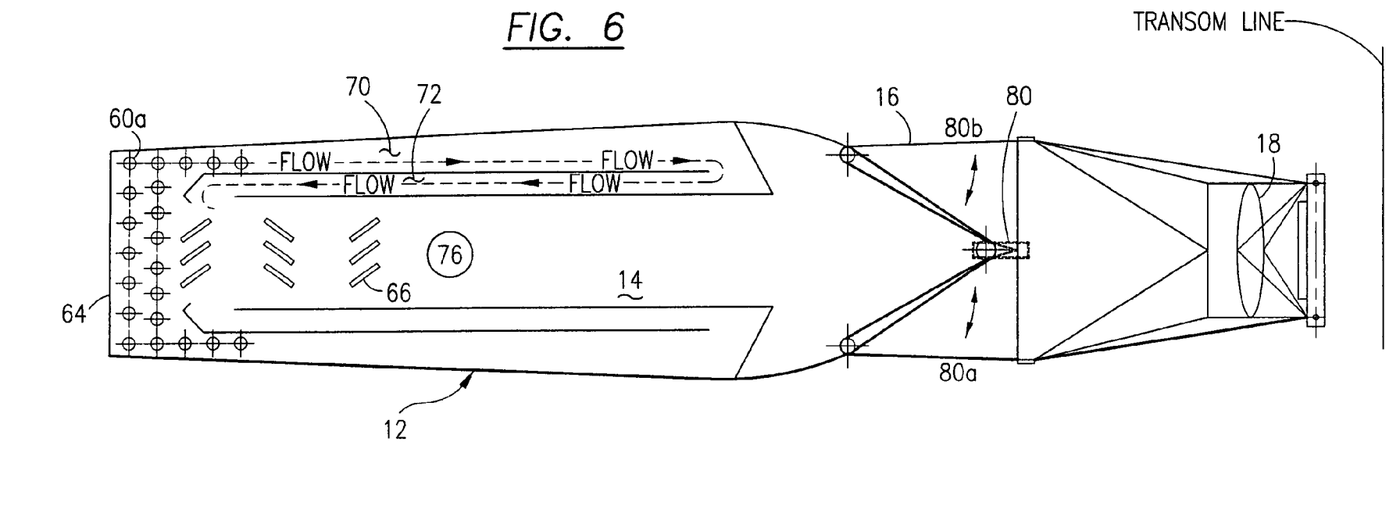
FIG. 6 diagrammatically illustrates a top schematic view of the tunnel providing the oxygenation zone for the waterborne vessel.

FIG. 6 diagrammatically shows a schematic top view of oxygenation system 12. The plurality of conduits, one of which is conduit 60A, is disposed laterally away from other gas/water injection ports at intake 64 of tunnel 14. In order to supersaturate a part of the water flow, a diversion channel 70 is disposed immediately downstream a portion or all of conduits 60 such that a portion of water flow through tunnel intake 64 passes into diversion channel 70. Downstream of diversion channel 70 is a reverse flow channel 72. The flow is shown in dashed lines through diversion channel 70 and reverse flow channel 72. The primary purposes of diversion channel 70 and reverse flow channel 72 are to (a) segregate a portion of water flow through tunnel 14; (b) inject, in a preferred embodiment, ozone plus hydroxyl radical gas as well as atmospheric oxygen into that sub-flow through diversion channel 70; and (c) increase the time the gas mixes and interacts with that diverted channel flow due to the extended time that diverted flow passes through diversion channel 70 and reverse flow channel 72. These channels form a supersaturation channel apart from main or primary flow through tunnel 14.

Other flow channels could be created to increase the amount of time the hydroxyl radical gas oxygenated water mixture interacts with the diverted flow. For example, diversion channel 70 may be configured as a spiral or a banded sub-channel about a cylindrical tunnel 14 rather than configured as both a diversion channel 70 and a reverse flow channel 72. A singular diversion channel may be sufficient. The cleansing operation of the decontamination vessel is dependent upon the degree of pollution in the body of water surrounding the vessel. Hence, the type of oxygenated water and the amount of time in the tunnel and the length of the tunnel and the flow or volume flow through the tunnel are all factors which must be taken into account in designing the decontamination system herein. In any event, supersaturated water and gas mixture is created at least the diversion channel 70 and then later on in the reverse flow channel 72. The extra time the entrapped gas is carried by the limited fluid flow through the diversion channels permits the ozone and the hydroxyl radical gas to interact with organic components and other compositions in the entrapped water, cleaning the water to a greater degree as compared with water flow through central region 76 of primary tunnel 14. In the preferred embodiment, two reverse flow channels and two diversion channels are provided on opposite sides of a generally rectilinear tunnel 14. FIG. 4A shows the rectilinear dimension of tunnel 14. Other shapes and lengths and sizes of diversion channels may be used.

When the oxygenation system is ON, gills 16 are placed in their outboard position thereby extending the length of tunnel 14 through an additional elongated portion of vessel 10. See FIG. 1. Propeller in region 18 provides a propulsion system for water in tunnel 14 as well as a propulsion system for vessel 10. Other types of propulsion systems for vessel 10 and the water through tunnel 14 may be provided. The important point is that water flows through tunnel 14 and, in a preferred embodiment, first, second and third oxygenated water mixtures (ozone+pressurized water; ozone+hydroxyl radical gas+pressurized water; and atmospheric oxygen+pressurized water) is injected into an input region 64 of a tunnel which is disposed beneath the waterline of the vessel.

In the preferred embodiment, when gills 16 are closed or are disposed inboard such that the stern most edge of the gills rest on stop 80, vessel 10 can be propelled by water flow entering the propeller area 18 from gill openings 80A, 80B. When the gills are closed, the oxygenation system is OFF.

Figure 7:
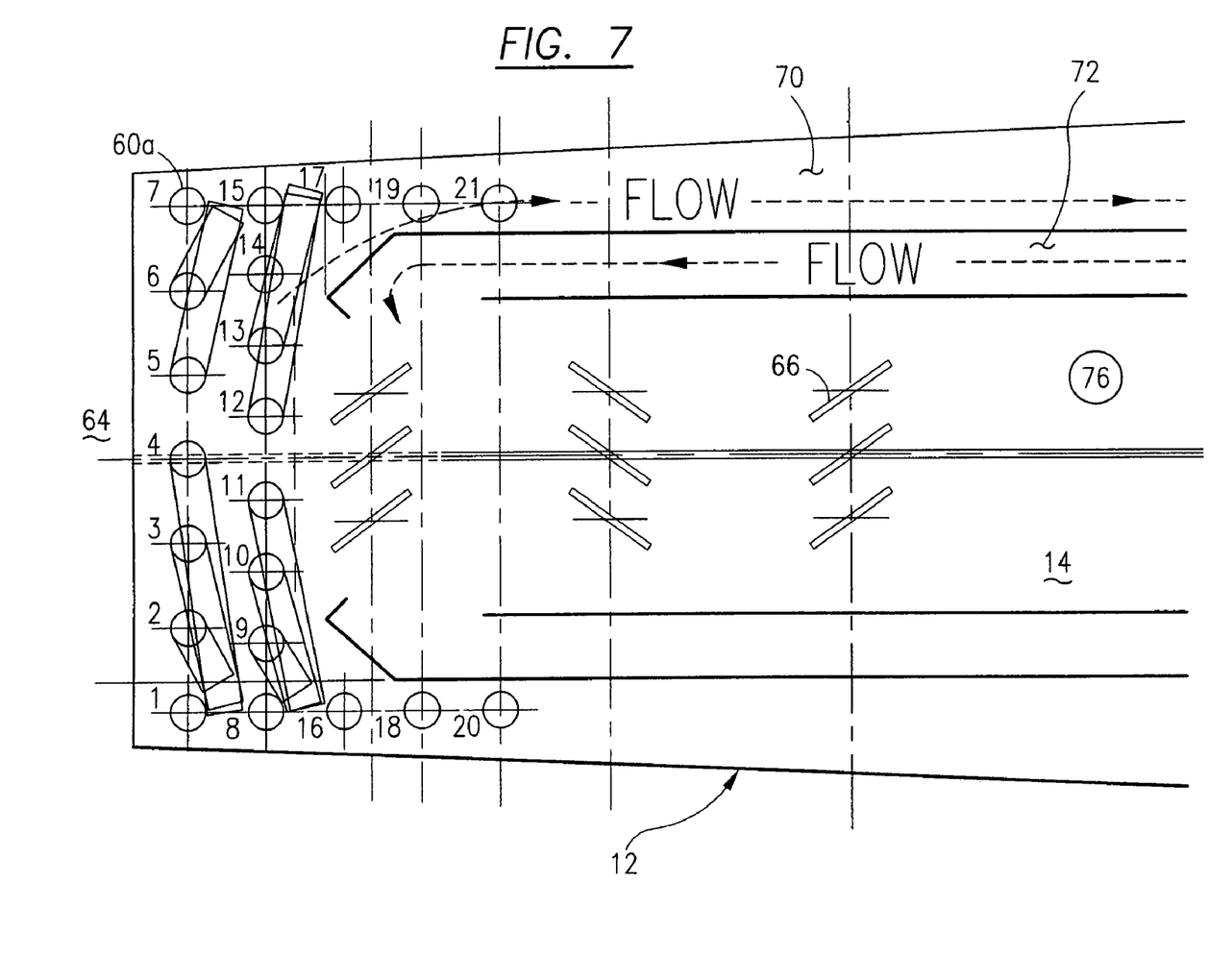
FIG. 7 diagrammatically illustrates the output ports (sometimes called injector ports) and distribution of oxygenated water mixtures (ozone, ozone plus hydroxyl radical gas and atmospheric oxygen) into the tunnel for the oxygenation system.

FIG. 7 diagrammatically illustrates the placement of various conduits in the injector matrix. The conduits are specially numbered or mapped as 1-21 in FIG. 7. The following Oxygenation Manifold Chart shows what type of oxygenated water mixture which is fed into each of the specially numbered conduits and injected into the intake 64 of tunnel 14.

| Oxygenation Manifold Chart | |
|---|---|
| Gas | Tubes |
| $O_3$ + OH | 1, 8, 16; 7, 15, 17 |
| $O_3$ | 3, 4, 5, 11, 12, 13 |
| $O_2$ | 2, 9, 10, 18, 20; 6, 14, 19, 21 |

As noted above, generally an ozone plus hydroxyl radical gas oxygenated water mixture is fed at the forward-most points of diversion channel 70 through conduits 7, 15, 17, 1, 8 and 16. Pure oxygen (in the working embodiment, atmospheric oxygen) oxygenated water mixture is fed generally downstream of the hydroxyl radical gas injectors at conduits 19, 21, 18, 20. Additional atmospheric oxygen oxygenated water mixtures are fed laterally inboard of the hydroxyl radical gas injectors at conduits 6, 14, 2, 9, and 10. In contrast, ozone oxygenated water mixtures are fed at the intake 64 of central tunnel region 76 by conduit output ports 5, 4, 3, 13, 12, and 11. Of course, other combinations and orientations of the first, second and third oxygenated water mixtures could be injected into the flowing stream of water to be decontaminated. However, applicant currently believes that the ozone oxygenated water mixtures has an adequate amount of time to mix with the water from the surrounding body of water in central tunnel region 76 but the hydroxyl radical gas from injectors 7, 15, 17, 1, 8, 16 need additional time to clean the water and also need atmospheric oxygen input (output ports 19, 21, 8, 20) in order to supersaturate the diverted flow in diversion channel 70 and reverse flow channel 17. The supersaturated flow from extended channels 70, 72 is further injected into the mainstream tunnel flow near the tunnel flow intake.

Further additional mechanisms can be provided to directly inject the ozone and the ozone plus hydroxyl radical gas and the atmospheric oxygen into the intake 64 of tunnel 14. Direct gas injection may be possible although water through-put may be reduced. Also, the water may be directly oxygenated as shown in FIG. 4C and then injected into the tunnel. The array of gas injectors, the amount of gas (about 5 psi of the outlets), the flow volume of water, the water velocity and the size of the tunnel (cross-sectional and length) all affect the degree of oxygenation and decontamination.

Currently, flow through underwater channel 14 is, at a minimum, 1000 gallons per minute and, at a maximum, a flow of 1800 gallons per minute is achievable. Twenty-one oxygenated water mixture output jets are distributed both vertically (FIGS. 4A and 5) as well as laterally and longitudinally (FIGS. 6 and 7) about intake 64 of tunnel 14. It is estimated that the hydroxyl radical gas needs about 5-8 minutes of reaction time in order to change or convert into oxygen. Applicant estimates that approximate 15-25% of water flow is diverted into diversion channel 70. Applicant estimates that water in the diversion channel flows through the diverters in approximately 5-7 seconds. During operation when the oxygenation system is operating, the boat can move at 2-3 knots. The vessel need not move in order to operate the oxygenation system.

Figures 8A, 8B:
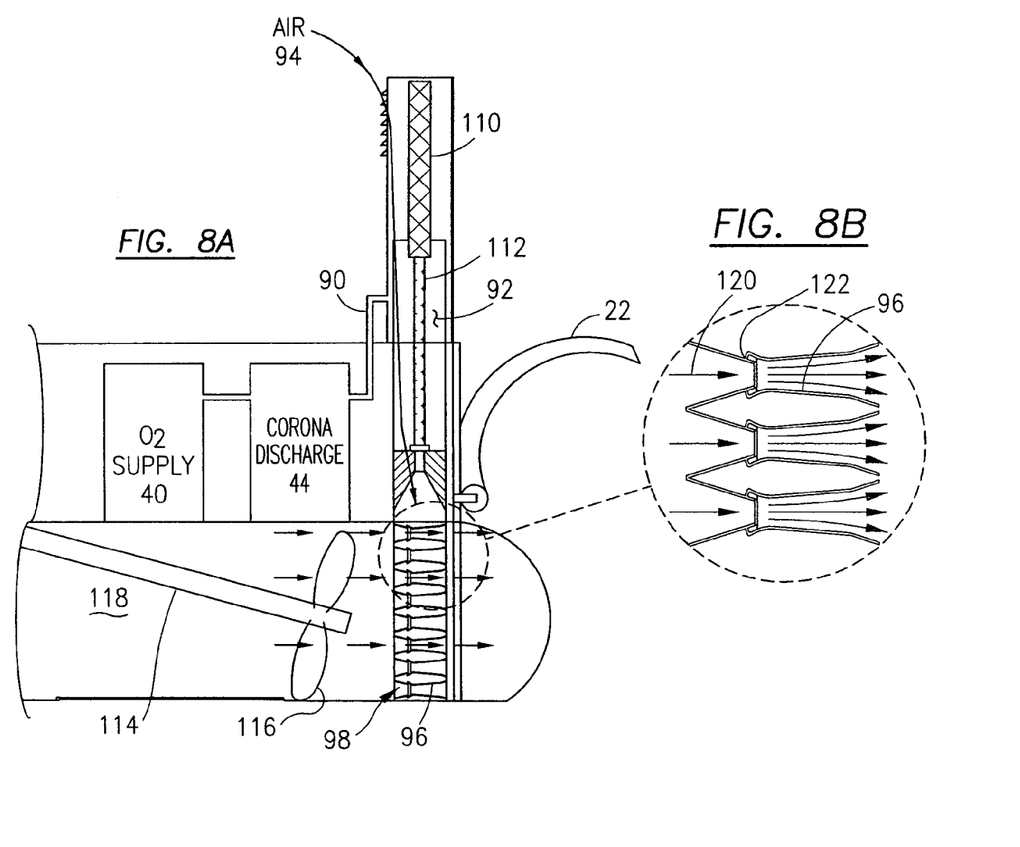
FIG. 8A diagrammatically illustrates another oxygenation system.
FIG. 8B diagrammatically illustrates a detail of the gas injection ports in the waterborne stream.
Figure 9:
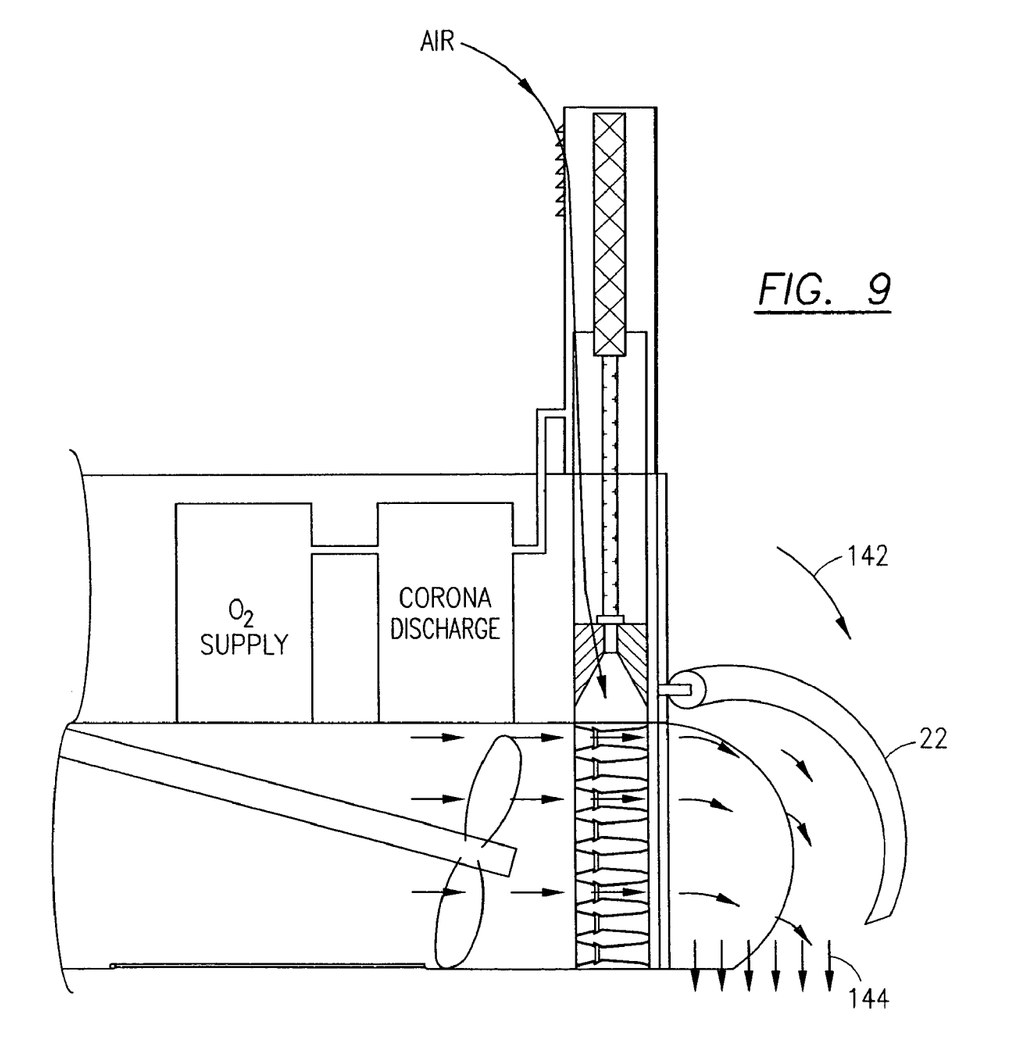
FIG. 9 diagrammatically illustrates the deflector vane altering the output flow from the oxygenation tunnel.

FIG. 8 shows an alternative embodiment which is possible but seems to be less efficient. A supply of oxygen 40 is fed into an ozone generator 44 with a corona discharge. The output of ozone gas is applied via conduit 90 into a chamber 92. Atmospheric oxygen or air 94 is also drawn into chamber 92 and is fed into a plurality of horizontally and vertically disposed nozzles 96. Manifold 98 consists of a plurality of oxygenation nozzles 96. Manifold 98 can be raised or lowered by any appropriate means. In the illustrated embodiment, rotating threaded sleeve 110 operates on threaded rod 112 to raise and lower oxygenation manifold 98. Diverter blade 22 can be raised and lowered by another mechanism generally shown as lifting mechanism 24 in FIG. 1. Shaft 114 drives propeller 116 to provide a propulsion system to move water through tunnel 118. FIG. 8A shows that the water propulsion system to move the water through the tunnel could be forward the tunnel intake 64 shown in FIG. 6. The alternative embodiment also shows that the tunnel may be foreshortened.

FIG. 8B is a detail showing gas injection nozzle 96 and water flow 120 passing through restricted flow channel 122.

FIG. 9 diagrammatically shows that diversion blade 22, when rotated downward as shown by arrow 142, directs oxygenated and treated water output 144 the oxygenation systems into lower depths of the body of water being treated by vessel 10.

Figure 10:
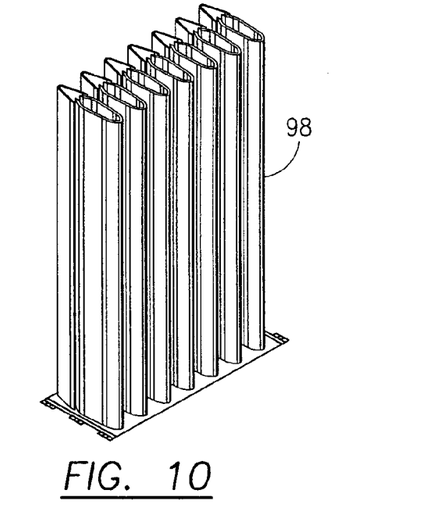
FIG. 10 diagrammatically illustrates the oxygenation manifold in the further embodiment.

FIG. 10 diagrammatically illustrates aeration injector manifold 98.

Figure 11:
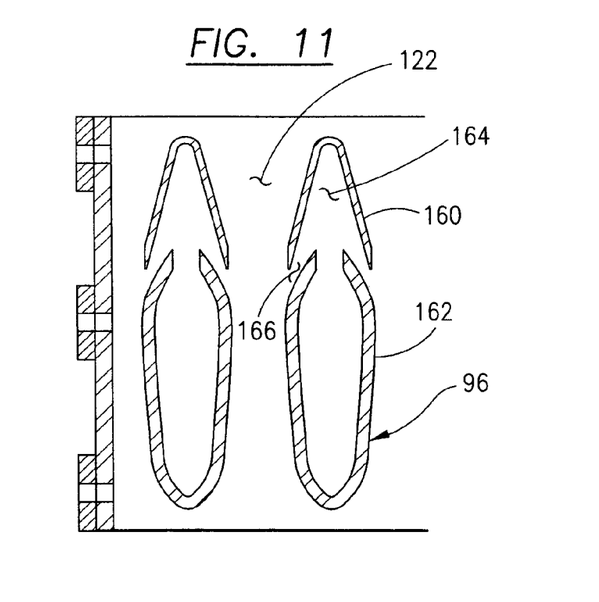
FIG. 11 diagrammatically illustrates the gas vanes for the alternate embodiment.

FIG. 11 shows aeration injectors 96 having a forward inverted V shaped body 160 and a rearward generally oval shaped body 162. Air plus ozone is pumped or drawn into the interior region 164 of V shaped body 160. Water flow is directed through constricted channel 122 and a high degree of turbulence in region 166 mixes the ozone with the water flow through constricted channel 122. This turbulence in restricted flow channel 122 causes the ozone and atmospheric oxygen to mix with the water flow thereby oxygenating the water.

FIG. 12 shows a pressurized gas system which has been described earlier.

The claims appended hereto are meant to cover modifications and changes within the scope and spirit of the present invention.

What is claimed is:

1. A method of oxygenating and decontaminating water surrounding water in a body of water with a waterborne vessel, said waterborne vessel having an underwater tunnel with an intake and an output, the method comprising:

said tunnel having a longitudinal axis and a closed perimeter wall surrounding the longitudinal axis of the tunnel, said tunnel and perimeter wall further including a diversion channel with a first, upstream portion and a second, downstream portion, said first and second portions defining a diversionary path;

moving water through said tunnel;

diverting a portion of said water into said diversionary path from said tunnel, wherein the diverted water first flows through said first portion of said diversion channel and then flows into said second portion, wherein a flow direction of the diverted water in the second section is opposite to a flow direction of said water moving through said tunnel;

providing a source of ozone and a source of pressurized water;

intermixing said ozone and said pressurized water and creating a first oxygenated water mixture;

injecting said first oxygenated water mixture at a location within said tunnel proximate said intake.

2. A method of oxygenating and decontaminating water surrounding water in a body of water with a waterborne vessel, said waterborne vessel having an underwater tunnel with an intake and an output, the method comprising:

said tunnel having a longitudinal axis and a closed perimeter wall surrounding the longitudinal axis of the tunnel, said tunnel and perimeter wall further including a diversion channel with a first, upstream portion and a second, downstream portion, said first and second portions defining a diversionary path;

moving water through said tunnel;

diverting a portion of said water into said diversion channel defining a diversionary path from said tunnel, wherein the diverted water first flows through said first portion of said diversion channel and then flows into said second portion, wherein a flow direction in the second section is opposite to a flow direction of said water moving through said tunnel;

providing a source of ozone and a source of pressurized water;

intermixing said ozone and said pressurized water and creating a first oxygenated water mixture;

injecting said first oxygenated water mixture at a location within the tunnel proximate the intake; and super-saturating said portion of said water in said diversionary path.

3. A method as claimed in claim 1 wherein a flow direction in said upstream first portion is not opposite to the flow direction of said water moving through said tunnel and said downstream second portion defines a reverse flow channel, wherein a flow direction in the reverse flow channel is opposite to the flow direction of said water moving through said tunnel.

4. A method as claimed in claim 3 wherein the step of super-saturating includes providing a source of ozone plus hydroxyl radical gas, intermixing said ozone plus hydroxyl radical gas and said pressurized water and creating a second oxygenated water mixture, and injecting said second oxygenated water mixture into said diversionary path.

5. A method as claimed in claim 2 wherein the step of super-saturating includes providing a source of ozone plus hydroxyl radical gas, intermixing said ozone plus hydroxyl radical gas and said pressurized water and creating a second oxygenated water mixture, and injecting said second oxygenated water mixture into said diversionary path.

6. A method as claimed in claim 5 including creating turbulence in the water moving through said tunnel downstream of the injection of said first oxygenated water mixture.

7. A method as claimed in claim 2 including creating turbulence in the water moving through said tunnel downstream of the injection of said first oxygenated water mixture.

8. A method of oxygenating and decontaminating water surrounding water in a body of water with a waterborne vessel, said waterborne vessel having an underwater tunnel with an intake and an output, the method comprising:

said tunnel having a longitudinal axis and a closed perimeter wall surrounding the longitudinal axis of the tunnel, said tunnel and perimeter wall further including a diversion channel therein;

moving water through said tunnel;

diverting a portion of said water into said diversion channel defining a diversionary path from said tunnel;

providing a source of ozone and a source of pressurized water;

intermixing said ozone and said pressurized water and creating a first oxygenated water mixture;

injecting said first oxygenated water mixture at a location within the tunnel proximate the intake;

providing a source of ozone plus hydroxyl radical gas;

intermixing said ozone plus hydroxyl radical gas and said pressurized water and creating a second oxygenated water mixture; and injecting said second oxygenated water mixture into said diversionary path.

9. A method as claimed in claim 8 including creating turbulence in the water moving through said tunnel downstream of the injection of said first oxygenated water mixture.

* * * * *